(12) United States Patent
O'Rourke et al.

(10) Patent No.: US 12,072,281 B2
(45) Date of Patent: Aug. 27, 2024

(54) MULTIPASS OPTICAL SPECTROSCOPY CELL HAVING A SINGLE TRANSMISSION PATH

(71) Applicant: SAVANNAH RIVER NUCLEAR SOLUTIONS, LLC, Aiken, SC (US)

(72) Inventors: Patrick E. O'Rourke, Martinez, GA (US); Kimberly Alicia Strange Fessler, Aiken, SC (US); Donald J. Pak, Martinez, GA (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 0 days.

(21) Appl. No.: 16/661,528

(22) Filed: Oct. 23, 2019

(65) Prior Publication Data
US 2021/0123858 A1    Apr. 29, 2021

(51) Int. Cl.
   *G01N 21/25*    (2006.01)
   *G01N 21/39*    (2006.01)
(52) U.S. Cl.
   CPC ........... *G01N 21/255* (2013.01); *G01N 21/39* (2013.01); *G01N 2201/0612* (2013.01)
(58) Field of Classification Search
   CPC ................. G01N 21/255; G01N 21/39; G01N 2201/0612; G01N 21/0314
   See application file for complete search history.

(56) References Cited

U.S. PATENT DOCUMENTS

| 5,445,964 | A | * | 8/1995 | Lee ................. G01N 21/39 |
| | | | | 250/343 |
| 7,595,887 | B2 | | 9/2009 | Spartz et al. |
| 7,621,171 | B2 | | 11/2009 | O'Brien |
| 7,807,061 | B2 | | 10/2010 | Wado et al. |
| 8,374,209 | B2 | | 2/2013 | Eckles et al. |
| 8,531,659 | B2 | | 9/2013 | So et al. |
| 8,759,767 | B2 | | 6/2014 | Carter et al. |
| 8,842,282 | B2 | | 9/2014 | Keller et al. |
| 9,194,794 | B2 | | 11/2015 | Wilkins |
| 9,671,332 | B2 | | 6/2017 | Christensen |

(Continued)

FOREIGN PATENT DOCUMENTS

| CN | 103398950 | 8/2015 |
| DE | 10216047 | 10/2003 |

(Continued)

OTHER PUBLICATIONS

Das, et al. "Very long optical path-length from a compact multi-pass cell" *Appl. Phys. B.* 103(3) (2011) pp. 749-754.

(Continued)

*Primary Examiner* — Hwa Andrew Lee
(74) *Attorney, Agent, or Firm* — Dority & Manning, P.A.

(57) ABSTRACT

Optical cells are described for use in spectroscopy applications. The cells include a series of discrete planar reflectors aligned with one another and spaced apart from one another at each end of the sample cavity. The discrete planar reflectors can be surrounded by transparent windows and divergent energy can be removed from the cell cavity via the windows. The cells can define a unique beam path for the energy beam, and there can be no overlapping optical paths through the cell. The cells can provide well-defined detection signals with very high signal-to-noise ratio.

12 Claims, 4 Drawing Sheets

(56) References Cited

U.S. PATENT DOCUMENTS

| | | |
|---|---|---|
| 2017/0139182 A1 | 5/2017 | Sawyers |
| 2017/0184520 A1* | 6/2017 | Mortensen ....... G01N 23/20091 |
| 2018/0011003 A1 | 1/2018 | Baum et al. |
| 2018/0259452 A1* | 9/2018 | Li .......................... G01N 21/05 |
| 2018/0313796 A1 | 11/2018 | Jeannotte et al. |
| 2019/0056311 A1 | 2/2019 | Sawyers |

FOREIGN PATENT DOCUMENTS

| | | |
|---|---|---|
| WO | WO 2008/110927 | 9/2008 |
| WO | WO 2013/034482 | 3/2013 |
| WO | WO 2018/162193 | 9/2018 |

OTHER PUBLICATIONS

IRSWEEP. "IRcell Multi-Pass Cell Datasheet" *IRsweep AG* (2016) pp. 1-2.

Tuzson, et al. "Compact multipass optical cell for laser spectroscopy" *Opt. Lett.* 38(3) (2013) pp. 257-259.

\* cited by examiner

MULTIPASS OPTICAL SPECTROSCOPY CELL HAVING A SINGLE TRANSMISSION PATH

FEDERAL RESEARCH STATEMENT

This invention was made with Government support under Contract No. DE-AC09-08SR2470, awarded by the United States Department of Energy. The Government has certain rights in the invention.

BACKGROUND

Spectroscopy utilizes detection of the result of energy-matter interaction at controlled input to determine chemical or electrical characteristics of a sample and has found use in many analyte detection regimes. The energy-matter interaction usually takes the form of absorbance as energy is transmitted through a sample, but may also apply to changes as the energy is scattered from the sample, or emission as a result of the response of a component of the sample to the incident energy.

Absorbance spectroscopy has wide utility in sample analysis, as the wavelengths at which an analyte absorbs the incident energy is indicative of the type of analyte, and the amount of energy absorbed at these wavelengths is proportional to analyte concentration. These features of absorbance are intrinsic to the analyte and are theoretically independent of the measurement instrument. As such, these features can allow for the application of analysis techniques to establish accurate determination of analyte concentrations over a wide range of states or conditions of the analyte. These capabilities are described in the literature; for example, see Baylor and O'Rourke (L. C. Baylor and P. E. O'Rourke, "UV-Vis for On-Line Analysis," in "Process Analytical Technology," K. A. Bakeev, Ed., Blackwell Publishing, Oxford, UK, 2005, Ch. 6).

Spectroscopy, and particularly absorbance spectroscopy, can simply and accurately determine the composition of samples. In many cases however, for instance when detecting analyte at low concentration or with low sample size, the absorbance signal must be enhanced. Signal enhancement is generally carried out by increasing the path length of the beam through the sample. Unfortunately, long path length cells typically require large volume samples, which is not always feasible, and large volume cells exhibit decreased efficiency.

What is needed in the art is an optical cell that can define a long path length for an energy beam while defining a relatively small cell volume. An optical cell that combines a long path length with a small cell volume that is capable of accurate spectroscopic analysis of small sample volumes with low analyte concentrations would be of great benefit.

SUMMARY

According to one embodiment, disclosed is a multi-pass optical cell that can define a long path length, even for a relatively small cell volume. A multi-pass optical cell can include a first end and a second end with a cell cavity defined therebetween. A cell can also include a first set of reflectors at the first end and of the cavity a second set of reflectors at the second end of the cavity. The reflectors of each set can be aligned with one another and separated from one another on the respective ends of the cell cavity. The reflectors all include a planar reflection face, with the planar reflection faces of all of the reflectors being parallel to one another. The cell also includes an inlet for an incident energy beam and an outlet for a resulting energy beam, with a beam path defined between the inlet and the outlet and the beam path at the inlet being parallel to the beam path at the outlet. The beam path includes a plurality of passes through the cell, with each pass beginning or ending at a reflector. In one embodiment, each end of the cavity can also include a substrate between the reflectors that is transparent to at least one wavelength of electromagnetic radiation, e.g., a window surrounding each reflector that can serve to remove divergent light from the cell interior. In one embodiment, the total number of passes through the cell can be a prime number.

The multi-pass spectroscopy cell can be designed for very small sample volumes, for instance on the order of from about 1 milliliter (mL) to about 500 mL. In this embodiment, the reflectors can be very small, on the order of a few millimeters or less in height, and tightly packed.

Also disclosed is a spectroscopy system that includes a multi-pass spectroscopy cell as described in conjunction with an electromagnetic radiation source and detector. The source can be in optical communication with the inlet to deliver an incident energy beam to the multi-pass cell cavity, and the detector can be in optical communication with the outlet to receive and analyze a resulting energy beam from the cell. The source can provide an electromagnetic beam of any suitable wavelength, e.g., infrared (IR) to ultraviolet (UV) and can provide a beam that carries energy of a single wavelength or multiple wavelengths. The detector can be any suitable detector that can be used to determine or measure an effect of interaction of an incident electromagnetic beam from the source with a sample (or a component of a sample) held in the cell cavity. A system can also include a sample source that can be in fluid communication with a sample inlet of the multi-pass spectroscopy cell cavity.

A spectroscopy method for analyzing a fluid sample is also disclosed. For instance, a method can include locating a fluid sample in the cell cavity of a multi-pass optical cell as described, directing a beam of incident electromagnetic energy into the inlet of the cell, and detecting the resulting beam after it passes along the beam path and exits the cell. Fluid samples can include any type of fluid, including liquid, gas, plasma, or any combination thereof, and can carry one or more analytes. The method can detect the presence or quantity of one or more analytes in the sample, for instance via absorbance spectroscopy. In one embodiment, the method can be used to detect analytes in a small sample size (e.g., less than 500 mL) and at low concentration levels (e.g., parts per billion). For instance, the method can be utilized to detect small quantities of actinides in a gas sample.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed are optical cells as may be utilized in spectroscopy applications, and in one particular embodiment, in absorbance spectroscopy applications. The cells can provide a long path length for an energy beam (also referred to herein as an optical beam), even at small sample volumes. For instance, in one embodiment, a multi-pass optical cell as described can have a path length up to 23 times longer than the length dimension of the cavity. The optical cells can provide high quality signals, even at long path lengths for relatively small sample volumes. To maintain high quality signals, divergent energy from the energy beam can be removed from the cell as the beam proceeds along the beam path through the cell cavity. In addition, the cell can define a unique beam path for the energy beam to pass through the cell. As such, there can be no overlapping optical paths through the cell. The design can result in a well-defined detection signal with very high signal-to-noise ratio. The cells can be utilized in highly efficient and sensitive detection regimes for even small volume samples containing low analyte concentrations.

The disclosed cells and methods can be utilized in any number of analyte detection protocols utilizing detection of the interaction of an input energy beam with the analyte(s) of interest. One example of an application for which the optical cell can be highly effective is in actinide detection including, without limitation, detection of plutonium, uranium, neptunium, americium, etc. in a fluid sample. For instance, an analysis technique using the cell can be particularly beneficial in conjunction with a plutonium purification process. It should be understood, however, that while the cells can be particularly effective in detection of small concentration of actinide in small volume samples, the disclosed devices and methods are in no way limited to this particular embodiment, or to actinide or concentration measurement in general. The disclosed optical cells are generalizable to any other detection regime in which the analysis of the interaction of an incident energy beam with matter can be aided by removal of divergent energy from the system and/or prevention of overlapping energy paths through the system. For instance, the optical cells can be utilized to examine samples in any fluid phase, including gases, liquids, plasmas or combinations of phases.

Figure 1:
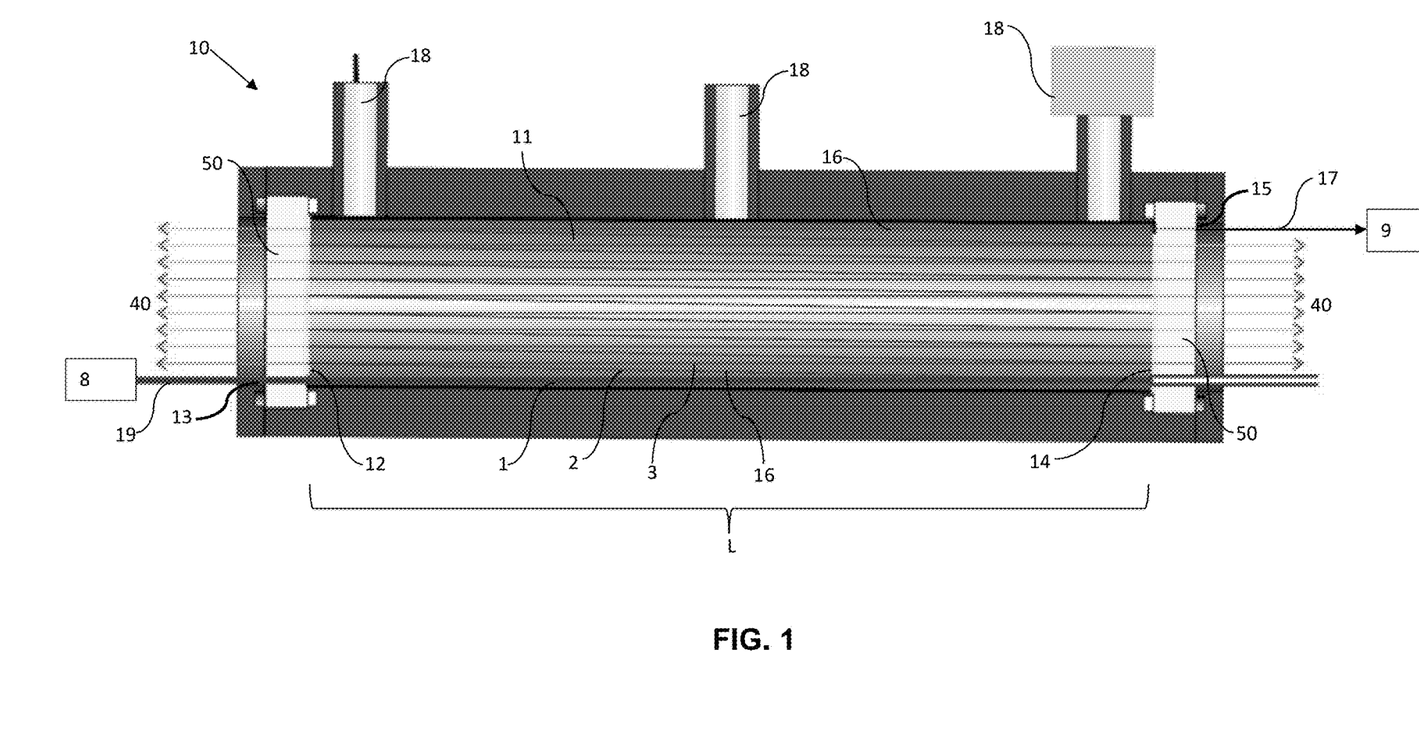
FIG. 1 schematically illustrates a side view of a multi-pass spectroscopy cell as described herein.

One embodiment of an optical cell 10 as disclosed herein is illustrated in FIG. 1. As shown, a cell 10 can include a cavity 11 defined between a first end 12 and a second end 14.

While the cavity 11 of an optical cell can have any desired volume, including large or small cell volumes as generally known in the art, in one embodiment, an optical cell 10 can have a small volume cavity 11. For instance, an optical cell 10 cavity 11 can define an interior volume of less than 500 mL, which is the volume of a typical low-volume IR spectroscopy cell. More specifically, an optical cell cavity can be smaller than previously thought possible for producing useful, high quality data. For instance, an optical cell can include a cell cavity 11 having a volume of about 450 mL or less, about 400 mL or less, about 350 mL or less, about 300 mL or less or about 250 mL or less, in some embodiments. For example, an optical cell cavity 11 can define an interior volume of about 1 mL or more, about 2 mL or more, about 3 mL or more, or about 5 mL or more, such as from about 1 mL to about 100 mL, or about 5 mL to about 50 mL, in some embodiments. In general, cavity volume is the product of cavity cross-sectional area and the cavity length. When it is desirable to reduce cavity volume but maintain cavity length, cavity cross-sectional area can be decreased.

A cell 10 can include a beam inlet 13 and a beam outlet 15 and will define a beam path 16 passing from the inlet 13 to the outlet 15. During use, an optical cell 10 can be placed in optical communication with a beam source 8 and a detector 9. A beam source 8 can deliver an incident beam 19 to the cavity 11 of the cell 10 via the inlet 13, and the beam can then proceed along the beam path 16 where resulting beam 17 exits at the outlet 15. As shown, the beam path 16 includes a plurality of passes 1, 2, 3, etc. across the length L of the cell cavity 11, with each pass extending uninterrupted from one end of the cavity 11 to the other. As shown, an incident beam 19 can enter the cell at the inlet 13 through the first end 12, pass to the second end 14 of the cell along pass 1, where it can be reflected and travel back to the first 12 end along pass 2, where it will be again reflected and travel back to the second end 14 along pass 3, and so on over the entire path length 16 to the outlet 15, where it the resulting beam 17 can be communicated to a detector 9.

Figure 2:
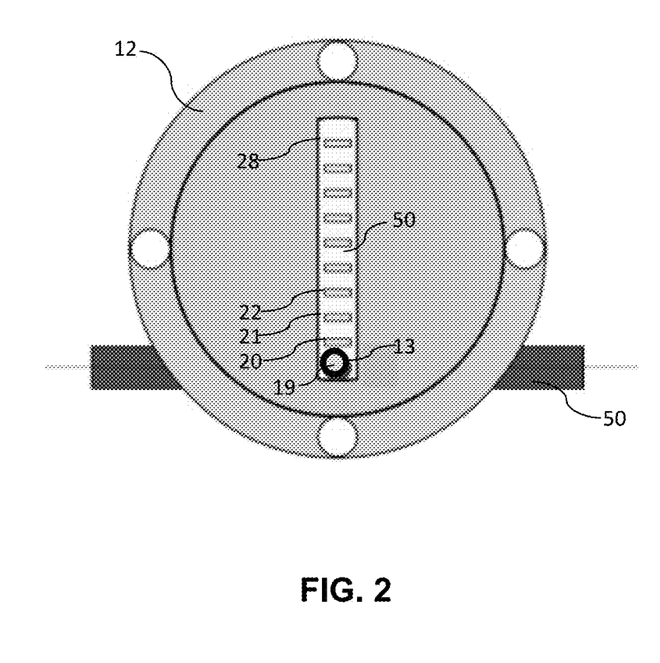
FIG. 2 schematically illustrates a first cavity end of a multi-pass spectroscopy cell as described herein.
Figure 3:
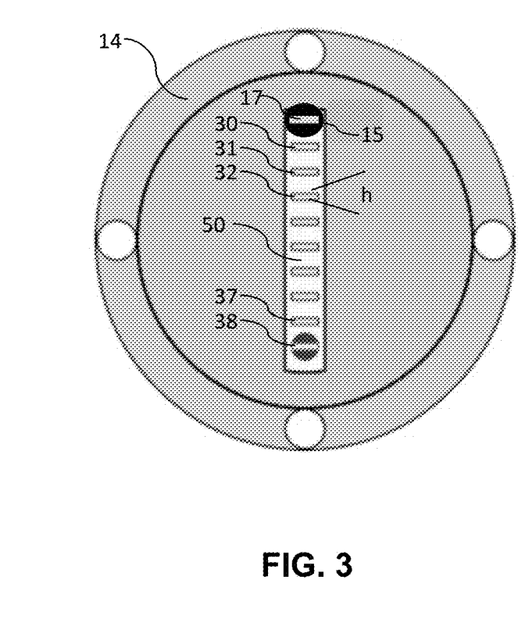
FIG. 3 schematically illustrates a second cavity end of a multi-pass spectroscopy cell as described herein.

To provide a long path length with high signal-to-noise ratio in the resulting beam 17 at detector 9, the optical cells have been designed to remove divergent light from the cell and/or to prevent the generation of overlapping optical paths between the inlet 13 and the outlet 15. This result is achieved by use of a plurality of discrete planar reflectors deposited on each end 12, 14 of the cavity 11. As indicated in FIG. 2, cavity end 12 can include a series of discrete planar reflectors 20, 21, 22, etc., 28 that are separated from and aligned with one another and, as indicated in FIG. 3, cavity end 14 can include a series of discrete planar reflectors 30, 31, 32, etc., 37, 38 that are separated from and aligned with one another. In addition, the two sets of planar mirrors on each end 12, 14 are separated from one another across the length L of the cell cavity 10 so as to face one another.

Each reflector has a reflection face facing into the cell cavity that is formed from a material that provides suitable reflection of an incident beam 19. The preferred material for the reflection faces of the reflectors can generally depend upon the nature (e.g., wavelength) of the energy beam used in a protocol. While the reflection face of each reflector can be highly reflective (i.e., reflective about 90% or more of the incident energy), this is not a requirement of the reflectors, and the term "reflection" is not limited herein to a particular high degree of reflection, or, similarly, to a low degree of absorption or transmission. For instance, in some embodiments, it may be acceptable for a reflector to exhibit a degree of reflection of only about 50% (meaning that only half of the impinging radiation is reflected, while the other half is absorbed or allowed to transmit through the reflector). In some embodiments, a highly reflective surface such as conventionally used for optical mirrors can be utilized. For instance, each reflection face of each reflector 20, 30, etc., can include a metal deposit, e.g. made by vacuum deposition, chemical vapor deposition, or any other suitable technique, of suitable metals including noble metals, such as gold, platinum or alloys, or by precipitation of silver, covered or not by a protective layer, as well as highly polished surfaces of metals, such as silver, noncorrosive steel, gold and other noble metals.

The reflection face of each reflector 20, 30, etc., can be planar, i.e., a reflection surface in which the angle of incidence of the reflection face is equal to (or substantially equal to) the angle of reflection. A simple test of planarity is generation of an undistorted and mirror image of an object held in front of the planar mirror. Planar quality in optics is typically specified in reference to a standard optical flat in terms of interference waves. In one embodiment, each planar reflector 20, 30, etc. can exhibit less than ¼ wave distortion in a reflected beam.

As illustrated, a set of reflectors can be mounted on each end 12, 14 of the optical cell cavity with the individual reflectors of each set spaced apart from one another and the reflection faces of all of the reflectors at both ends of the cavity parallel to one another. In addition, the reflectors of each end are held in alignment with one another and the two reflector sets are aligned with one another. For example, as illustrated in FIG. 2 and FIG. 3, a first set of reflectors 20, 21, 22, etc., 28 can be located on the first end 12 of a cell cavity such that they are spaced apart from one another and aligned with one another across the end 12, for instance across a diameter of a circular end 12 as illustrated. In addition, a second set of reflectors 30, 31, 32, etc., 37, 38 can be mounted on the second end 14 of the cell cavity such that they are spaced apart from one another and aligned with one another across the end 14. The alignments of the reflectors at each end of the cell correspond with each other, e.g., when the reflectors 20, 21, 22, etc. are aligned across a diameter of the end 12, the reflectors 30, 31, 32, etc. are aligned across the same diameter of the end 14. In addition, the spacing between adjacent reflectors in both reflector sets can be equivalent to one another.

The individual reflectors at each end 12, 14, are located with respect to one another such that during use, an incident beam 19 can enter the cell at the inlet 13 and be reflected back and forth across the cell passing from reflector to reflector until the resulting beam 17 exits the cell at the outlet 15. In the illustrated embodiment of FIGS. 1, 2, and 3, an incident beam 19 can enter the cell at inlet 13, travel to the second end 14 along pass 1 (FIG. 1) where it can be reflected at the planar reflection face of reflector 38 (FIG. 3), travel back to the first end 12 along pass 2 (FIG. 1) where it can be reflected at the planar reflection face of reflector 20 (FIG. 2), travel back to reflector 37 (FIG. 3) at end 14 along pass 3 (FIG. 1), and so on until the beam is reflected at the planar reflection face of reflector 28 (FIG. 2) and the resulting beam 17 passes through outlet 15 to the detector 9 (FIG. 1).

In order to limit the amount of diffusive energy from the beam within the cavity 11, each reflector can be surrounded by a substrate 50 (alternately referred to herein as a window) that is transparent to one or more wavelengths of energy. More specifically, the substrate 50 can be transparent to energy intended for use with the optical cells. For instance, in those embodiments in which an optical cell is intended for use with an energy beam in the IR or near IR spectra, the substrate 50 can be transparent to at least those expected wavelengths. In one such embodiment, zinc selenide (ZnSe) can be utilized, as it is known for low absorptivity at infrared wavelengths and high transmission in the visible spectrum. Other materials known for formation of IR transparent windows and the like can alternatively be utilized including, without limitation, zinc sulfide (ZnS), germanium (Ge), and gallium arsenide (GaAs).

The transparent substrate 50 can be constructed of material that is rigid, inert to the sample being monitored and to the ambient operating environment, and transparent in the spectral region of interest. Coatings may be employed on either or both faces of a substrate 50 to enhance chemical inertness and/or to reduce reflection at either surface of the substrate 50 (i.e., interior or external surfaces of a substrate 50). The substrate 50 may be retained in position by mechanical seal elements with surrounding materials of a cell, by sealants, adhesive bonding media, soldering, or other bonding or securement technique and material as would be evident to one of skill in the art.

In one embodiment, the reflectors 20, 30, etc. can be directly formed on the transparent substrate 50, e.g., according to a suitable deposition formation technique. Alternatively, the pre-formed reflectors can be attached to the transparent substrate according to any suitable attachment mechanism. The transparent substrate 50 can encompass an entire end 12, 14 of an optical cell (other than the areas covered by the reflectors) or can form only a portion of the ends 12, 14. For instance, as in the illustrated embodiment, a transparent substrate 50 can extend along the alignment length of the reflectors, and can extend away from each side of each reflector for a short distance, e.g., about the width of each reflector or less. For instance, in some embodiments, the transparent substrate 50 can be above and below each reflector in the alignment direction and extend very little or not at all to the side of each reflector. As schematically illustrated in FIG. 1, as an energy beam passes along the beam path 16 back and forth through the cavity 11, divergent energy 40 from the beam can pass through the transparent substrate 50 at either end 12, 14 of the cavity 11.

Selection of the size and spacing between adjacent reflectors can further reduce the presence of divergent energy from the energy beam as it passes along the beam path the cavity. To increase the probability that divergent light from an energy beam will pass through the transparent substrate 50 as it passes along the beam path 16 rather than be reflected and remain in the cavity 11, the height of each reflector h, i.e., as determined in the alignment direction, can be smaller than the center-to-center distance between adjacent reflectors. For instance, as indicated in FIG. 3, the height h of and individual reflector 32 can be about ⅓ or less of the center-to-center distance between reflector 32 and an adjacent reflector 31, and the center-to-center distance between adjacent reflectors (e.g., from the center of reflector 32 to the center of reflector 31 in the alignment direction) can be about 10 mm or less, for instance from about 1 mm to about 6 mm, or from about 2 mm to about 4 mm in some embodiments. The width of each reflector, i.e., that dimension normal to the alignment direction of the reflectors, is not particularly limited, and can vary depending upon costs, overall cell dimensions, input beam diameter, etc. For instance, in a small volume cell, the reflectors can generally be formed on a millimeter scale, with each reflector having a width of about 5 mm or less, e.g., about 3 mm or less and a height of about 4 mm or less, for instance from about 1 mm to about 2 mm in some embodiments. In general, all of the reflectors can be the same as one another in dimensions and spacing between adjacent reflectors and between the inlet and outlet and their respective adjacent reflectors on each end can also be the same.

To further improve the signal-to-noise ratio of a system, the reflectors of a beam path can be located so as to provide a unique transmission path through the cavity. A unique transmission path can be obtained by including a beam path formed of a prime number of passes through the cell from the inlet to the outlet. For instance, in the embodiment illustrated in FIG. 1, the beam path 16 includes 19 passes from the inlet 13 to the outlet 15. For any prime number of passes (1, 2, 3, 5, 7, 11, 13, 17, 19, 23, etc.), there will be a unique transmission path through the cavity. For other than a prime number of passes, overlapping transmission paths can exist for all factors of the total number of passes. For example, if the total number of passes through the cavity along the beam path is 15, there can also exist a beam path for 5 passes and for 3 passes. In order to obtain high quality data, signals from overlapping transmission paths should be separated from one another, which has proven very difficult. In fact, the generation of overlapping transmission paths and the difficulties of their separation has been a problem in development of small optical cells for some time. The ability to define a single, unique transmission path through an optical cell by use of a plurality of planar, discrete reflectors can solve such previously known problems. Moreover, when combined with the removal of divergent light from the cavity by the transparent windows surrounding each discrete reflector, disclosed optical cells can be formed to have long beam paths, e.g., about 1 meter (m) or greater, or about 2 m or greater, with small volume cavities, e.g., about 500 mL or less, and can provide high quality analyte detection of even small analyte concentrations.

The number, size, and spacing of the reflectors to be included in an optical cell can be determined through analysis of the geometry of the optical cell and is dependent upon the maximum number of passes in the beam path (Np) and the height (H) of the cell cavity 11 (height refers to the direction of the reflector alignments across a cell cavity end). Dimensional characteristics of an optical cell can include:

Number of reflectors on each window=$(Np-1)/2$

Center-to-center reflector distance=$2*H/Np$

Height of each reflectors $\leq (2*H/Np)/3$

Distance of each reflector center from window center=$(2*(K-1))*H/(Np-H)/2$

Where K is the reflector number from K=1 to K=$[(Np-1)/2]$

Distance from beam inlet to window center=$-H/2$

Distance from beam outlet to window center=$+H/2$

Figure 4:
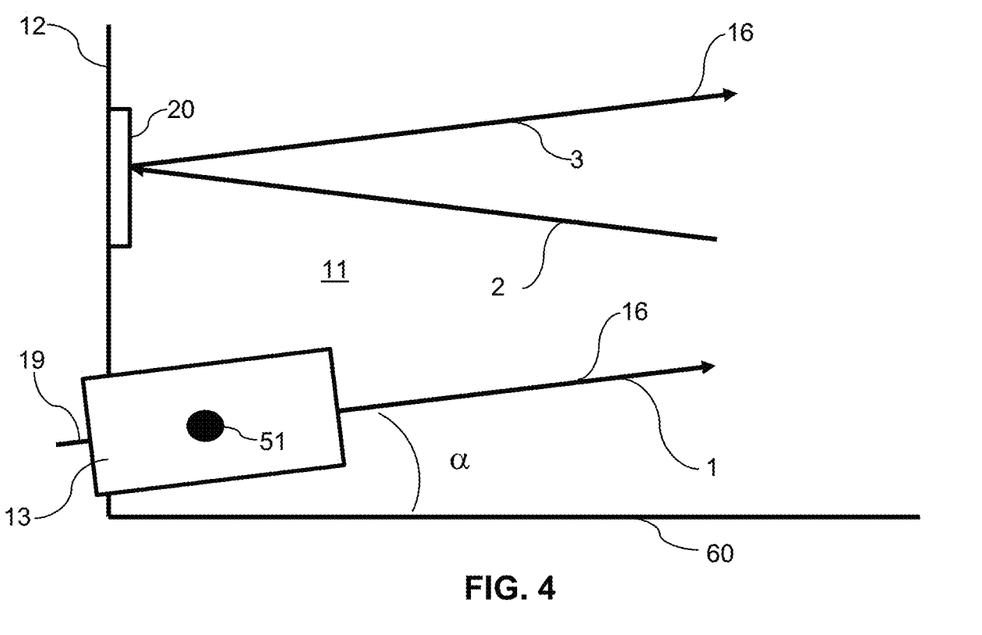
FIG. 4 schematically illustrates a beam inlet of an optical cell as described herein.

FIG. 4 provides a more detailed view of a beam inlet 13 to a cavity 11 of an optical cell 10. In order to reflect off of the planar mirrors in the cell (one example of which 20 is illustrated on the end 12 of the cell in FIG. 4) and progress through the optical cell along pass 3 of the beam path 16, the beam inlet 13, can describe an angle α to the cavity wall 60, which can in turn can be normal to the end 12 and to the plane of the reflection face of each reflector 20 held at either end of the cavity 11. The entrance angle (α) of the beam inlet will be:

$\alpha = \text{ArcTan}[H/(Np*L)]$ in which L is the cavity length from end 12 to end 14 and H is the cavity height in the alignment direction of the reflectors.

The beam path 16 at the inlet 13 and the outlet 15 will be parallel to one another and separated by a distance (BD) of:

$BD = H*\cos(\alpha)*(Np-1)/Np$

And the total path length of the beam path from the inlet to the outlet will be:

Total Path Length=$Np*L/(\cos(\alpha))$

In one embodiment, an optical cell can include a tilt mechanism 51 that can be in mechanical communication with the inlet 13. A tilt mechanism 51 can provide for modification of the angle of entry (α) of an incident beam 19 and adjustment of the incident beam 19 as it enters the inlet 13. Such modification can be utilized to adjust the beam path 16 through an optical cell. For instance, in one embodiment, a tilt mechanism 51 can be set such that an incident beam 19 enters at the inlet 13 and travels through the cavity 11 along pass 1 to an initial reflector at the second end and then travels back and forth through the cavity reflecting off of every reflector along each respective window. Upon modification of the angle of entry (α) at the inlet 13, the beam path 16 can be modified, for instance to optimize the alignment of the input beam to the set of mirror reflectors forming the optical path through the cell cavity.

An optical cell can include other standard features as are generally known in the art. For instance, referring again to FIG. 1, a cell 10 can include a number of access ports 18 that can be used for sample input/output, purge gas flow, control system access (e.g., pressure control, temperature control, etc.) as known in the art.

During use, an optical cell 10 can be utilized for any desired spectroscopic application, during which it can be placed in optical communication with any suitable energy beam source 8 at the inlet 13 and with any suitable beam detector 9 and analysis system at the outlet 15. In general, an energy beam source 8 can provide an incident beam 19 in the optical spectrum, which as utilized herein generally refers to electromagnetic radiation spanning from far IR (wavelength from about 15 micrometers (μm) to about 1 millimeter (mm) (corresponding to a frequency range of about 20 THz to about 300 GHz)) to extreme UV (wavelength from about 10 nm to about 124 nm, (corresponding to a frequency range of about 30 PHz to about 1 PHz)). For instance, an optical cell can be utilized in analysis techniques including, and without limitation to, IR spectroscopy, near IR spectroscopy, UV-Vis spectroscopy, terahertz spectroscopy, etc. The beam source 8 can be in optical communication with the inlet 13 via optical fiber or line-of-sight communication or any other suitable optical communication technique. For example, the energy source may in exemplary embodiments include an infrared light source, a UV light source, a visible light source, or other light source of specific desired spectral character. The energy source generally provides collimated light to the cavity and, depending upon the nature of the energy source, a system can include a beam collimator, a signal booster, etc. as are generally known in the art between a beam source 8 and a beam inlet 13.

The beam source 8 can deliver an incident beam 19 of a very narrow wavelength spectra or a broad range of wavelengths, as desired. For instance, in one embodiment, a system can include a laser (e.g., a tunable laser) that can deliver a coherent incident beam 19 of an essentially single wavelength to the optical cell cavity 11. In another embodiment, a broadband beam source 8 can be utilized. For instance, a beam source 8 can include a continuous broadband light source, such as a xenon arc lamp.

At the outlet 15 resulting beam 17, the optical cell 10 can be in optical communication with a suitable detector 9 that can include, e.g., an IR light detector such as a multi-channel IR light detector. The detector 9 can include appropriate filter, sensing, and signal processing components as are generally known in the art that are configured to provide information or signals for characterization or analysis of a fluid sample retained or passing through the cavity 11.

By way of example, the resulting beam 17 exiting the cavity 11 at outlet 15 can be focused on or in optical communication with an optical fiber with the entrance slit of a spectrometer. In one embodiment, a spectrometer can provide an electrical signal characteristic of the fingerprint absorption spectrum of one or more analytes contained in a sample in the cavity 11.

The inlet 13 and outlet 15 may be provided with windows as generally known in the art to provide an appropriate seal to the cavity 11. For instance, in one embodiment, inlet 13 and outlet 15 can be provided with windows of the same material as is used in formation of the transparent substrates 50 surrounding the reflectors at each end 12, 14 of the cavity 11. However, this is not a requirement of an optical cell 10 and any suitable transparent material can be utilized to pass an incident beam 19 into a cavity and a resulting beam 17 out of a cavity 11.

The other surfaces of an optical cell 10 can be fabricated of any suitable material of construction, dependent primarily on the physical and chemical requirements of the intended application of the system, the chemical reactivity of the fluid medium, regulatory requirements, operating environment, cost considerations, etc. By way of example, non-transparent walls of an optical cell can include a metal such as aluminum, stainless steel, or an alloy as required to meet applicable standards of chemical inertness.

Materials of construction such as ceramics, engineering polymers, or other polymers or resins (thermoplastic, thermosetting, catalytically cured) are encompassed for use in forming an optical cell. The walls of a cavity may be formed in segments by molding, casting, or other technique, for subsequent assembly of a composite wall structure, which may be further treated as desired, for instance by deposition of the individual reflectors on a surface of the transparent window segment of either end of a cavity. The wall segments in such composite wall structures may be assembled with bonding by suitable adhesive or sealant materials.

An optical cell may incorporate thermally conductive material and incorporate heat transfer components or capability, so that the interaction of the energy beam with a fluid in the cavity can be carried out at specific temperature. For example, a cell can be designed for use at an internal cavity temperature at all points being closely uniform. Heating or cooling elements may thus be provided in the cavity wall and/or in adjacent components for temperature control.

The present disclosure may be better understood with reference to the Examples set forth below.

Prophetic Example

Figure 5:
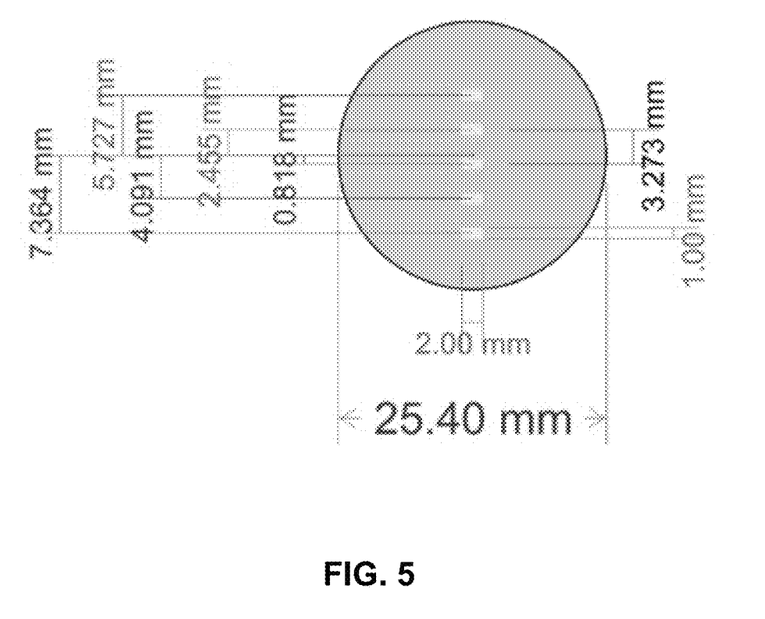
FIG. 5 schematically illustrates the dimensions of one representative example of a cavity end of a multi-pass spectroscopy cell.
Figure 6:
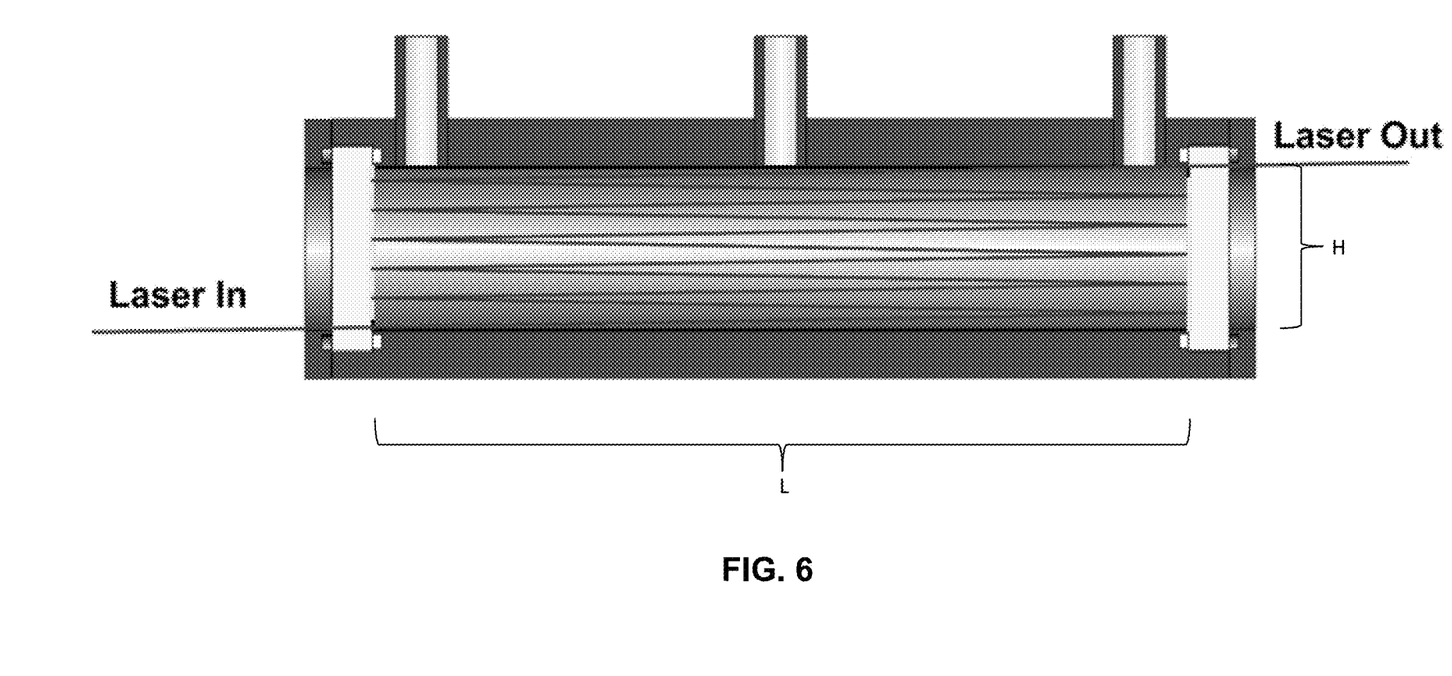
FIG. 6 schematically illustrates a side view of a representative multi-pass spectroscopy cell including the cavity end design of FIG. 5.

An optical cell as illustrated in FIG. 5 and FIG. 6 was designed. The optical cell was designed to include gold micro-mirrors deposited on a ZnSe window, i.e., ZnSe broadband AR coated window of 7-12 μm. As shown in FIG. 6, the total number of passes Np was set at 11, the cavity height H was 18 mm and the cavity length L was 100 mm.

The cell characteristics were determined as follows:

Number of reflectors on each window=$(Np-1)/2=5$

Center-to-center reflector distance=$2*H/Np=2*18/11=3.273$ mm

Height of each reflector$\leq (2*H/Np)/3=(2*18/11)/3=1.091$ mm

Width of each reflector selected to be 2 mm

The reflectors at each end are number K=1 to 5 such that reflector #1 (K=1) at the end of the aligned reflectors opposite to the beam inlet or outlet. So on the end of the cavity that includes the beam inlet at the bottom of the window, the reflectors are numbered K=1 to (Np−1)/2 from top to bottom, and at the opposite end of the cavity that includes the beam outlet at the top of the window, the reflectors are numbered K=1 to (Np−1)/2 from bottom to top.

Distance of each reflector center from window center=$(2*(K-1))*H/(Np-H)/2$

K=1, $D_1=-7.364$ mm
K=2, $D_2=-4.091$ mm
K=3, $D_3=-0.818$ mm
K=4, $D_4=2.455$ mm
K=5, $D_5=5.727$ mm

On FIG. 5, these distances are shown for the end of the cell that includes the beam outlet at the top, and as such, the distances for $D_1$, $D_2$ and $D_3$ are negative, i.e., below the center of the window, and the distances for $D_4$ and $D_5$ are positive, i.e., above the center of the window. For the opposite end, which includes the beam inlet at the bottom, the distances would be the same, but in the opposite orientation.

Distance from beam inlet to window center=$-H/2=-9$ mm

Distance from beam outlet to window center=$+H/2=+9$ mm

As indicated on FIG. 6, the laser in and the laser out paths are parallel to one another.

The entrance angle (α) of the beam inlet will be:

$\alpha=\text{ArcTan}[H/(Np*L)]=\text{ArcTan}[18/(11*100)]=0.9375°$

The beam path at the inlet and the outlet will be separated by a distance of:

$BD=H*\cos(\alpha)*(Np-1)/Np=18\cos(0.9375°)*(11-1)/11=16.36$ mm

The total path length of the beam path from the inlet to the outlet will be:

Total Path Length=$Np*L/(\cos(\alpha))=11*100/\cos(0.9375°)=1100.15$ mm

The total volume of a cylindrical cavity will be:

$V=\pi*(H/2)^2*L=\pi*(18/2)^2*100=25$ mL

The total volume of a rectangular cross-section cavity with 3 mm width will be:

$V=W*H*L=3*18*100=5.4$ mL

While certain embodiments of the disclosed subject matter have been described using specific terms, such description is for illustrative purposes only, and it is to be understood that changes and variations may be made without departing from the spirit or scope of the subject matter.

What is claimed is:

1. A system comprising:
an energy source that emits a collimated light;
an optical cell that includes:

a first end comprising a first substrate that is transparent to the collimated light, wherein only a portion of the first substrate is transparent to the collimated light, the first substrate including a first inner surface;
a second end comprising a second substrate that is transparent to the collimated light, wherein only a portion of the second substrate is transparent to the collimated light, the second substrate including a second inner surface;
a sample cavity defined between the first inner surface and the second inner surface;
a first series of reflectors on the first inner surface, the reflectors of the first series being spaced apart from one another and aligned with one another on the first inner surface, the first series of reflectors including adjacent reflectors that include a first reflector and a second reflector adjacent thereto with no reflector between the first reflector and the adjacent second reflector, each reflector of the first series comprising a planar reflection face, the planar reflection faces of the adjacent reflectors of the first series being co-planar with or parallel to one another;
a second series of reflectors on the second inner surface, the reflectors of the second series being spaced apart from one another and aligned with one another on the second inner surface, the second series of reflectors including adjacent reflectors that include a first reflector and a second reflector adjacent thereto with no reflector between the first reflector and the adjacent second reflector, each reflector of the second series comprising a planar reflection face, the planar reflection faces of the adjacent reflectors of the second series being co-planar with or parallel to one another;
an inlet for the collimated light;
an outlet fora resulting energy beam; and
a beam path defined between the inlet and the outlet, the beam path comprising a plurality of passes across a length of the sample cavity, each pass beginning or ending at a reflection face of a reflector, the beam path at the inlet being parallel to the beam path at the outlet, wherein the plurality of passes consists of a prime number of passes and wherein the beam path defines a single, unique energy transmission path; and
a spectrometer or detector in optical communication with the outlet.

2. The system of claim 1, wherein the cavity defines a volume of 500 milliliters or less.

3. The system of claim 1, wherein the beam path has a total path length from the inlet to the outlet of 2 meters or more.

4. The system of claim 1, wherein the reflectors of the first series are spaced apart from one another by a center-to-center distance of about 10 mm or less and the reflectors of the second series are spaced apart from one another by a center-to-center distance of about 10 mm or less.

5. The system of claim 4, wherein each reflector of the first series and the second series has a height in the direction of alignment of about 4 mm or less.

6. The system of claim 1, further comprising a sample inlet configured to deliver a fluid sample to the cavity.

7. The system of claim 1, wherein the energy source is a tunable infrared laser.

8. The system of claim 1, wherein the collimated light is at an infrared wavelength, an ultraviolet light wavelength, or a visible light wavelength.

9. The system of claim 1, wherein the spectrometer comprises an absorbance spectrometer.

10. A method for analyzing a fluid sample comprising:
locating a fluid sample in a cavity of a multi-pass optical cell, the cavity comprising an energy beam inlet, an energy beam outlet, and a single, unique energy transmission path defined between the inlet and the outlet, the cavity including a first end comprising a first substrate that defines a first inner surface of the cavity, wherein only a portion of the first substrate is transparent to a collimated light, the cavity including a second end comprising a second substrate that defines a second inner surface of the cavity, wherein only a portion of the second substrate is transparent to the collimated light, the first inner surface carrying a first series of reflectors that are spaced apart from one another and aligned with one another, the first series of reflectors including adjacent reflectors that include a first reflector and a second reflector adjacent thereto with no reflector between the first reflector and the adjacent second reflector, the second inner surface carrying a second series of reflectors that are spaced apart from one another and aligned with one another, the second series of reflectors including adjacent reflectors that include a first reflector and a second reflector adjacent thereto with no reflector between the first reflector and the adjacent second reflector, the reflectors of the first series and the second series each including a planar reflection face, the planar reflection faces of the adjacent reflectors of the first series being co-planar with or parallel to one another and the planar reflection faces of the adjacent reflectors of the second series being co-planar with or parallel to one another, the single, unique energy transmission path comprising a plurality of passes across a length of the cavity, each pass beginning or ending at a reflection face, the plurality of passes consisting of a prime number of passes;
communicating an incident energy beam to the inlet, the incident beam consisting of the collimated light, the collimated light passing along the energy transmission path; wherein divergent light from the collimated light along the energy transmission path is removed from the cavity via the transparent portion of the first substrate or via the transparent portion of the second substrate; and
detecting a resulting energy beam at the outlet.

11. The method of claim 10, wherein the fluid sample is a liquid sample, a gaseous sample, a plasma sample, or a combination thereof.

12. The method of claim 10, the sample comprising one or more actinides.

* * * * *